United States Patent
Schneider et al.

[15] 3,636,293
[45] Jan. 18, 1972

[54] METHOD AND APPARATUS FOR MELTING VITREOUS-TYPE MATERIALS

[72] Inventors: Harry E. Schneider, Elmhurst; William J. Plankenhorn, Lombard, both of Ill.

[73] Assignee: Eagle-Picher Industries, Inc., Cincinnati, Ohio

[22] Filed: Apr. 15, 1970

[21] Appl. No.: 28,643

[52] U.S. Cl. .................................. 219/10.49, 13/27
[51] Int. Cl. ........................... H05b 5/00, H05b 9/00
[58] Field of Search .................... 219/10.49; 13/27

[56] References Cited

UNITED STATES PATENTS

| | | | |
|---|---|---|---|
| 1,601,523 | 9/1926 | George | 13/27 X |
| 2,754,347 | 7/1956 | Wroughton et al. | 13/27 X |
| 2,793,242 | 5/1957 | Beckius et al. | 13/27 |
| 2,826,624 | 3/1958 | Reese et al. | 13/27 |
| 3,036,888 | 5/1962 | Lowe | 219/10.49 X |
| 3,484,840 | 12/1969 | Spoth et al. | 219/10.49 |

Primary Examiner—R. F. Staubly
Assistant Examiner—Hugh D. Jaeger
Attorney—Hill, Sherman, Meroni, Gross & Simpson

[57] ABSTRACT

Method and apparatus for melting vitreous-type materials utilizing induction heating in a continuous process. The materials to be melted, in particle or pellet form are supported within an electrically conductive susceptor, and temporarily supported on a refractory support. The heat radiated from the inductively heated susceptor serves to render the pellets fluid whereupon they pass through suitable orifices in the refractory support into a lower chamber where they are held with additional heating for a time sufficient to complete the required time-temperature relationship.

5 Claims, 2 Drawing Figures

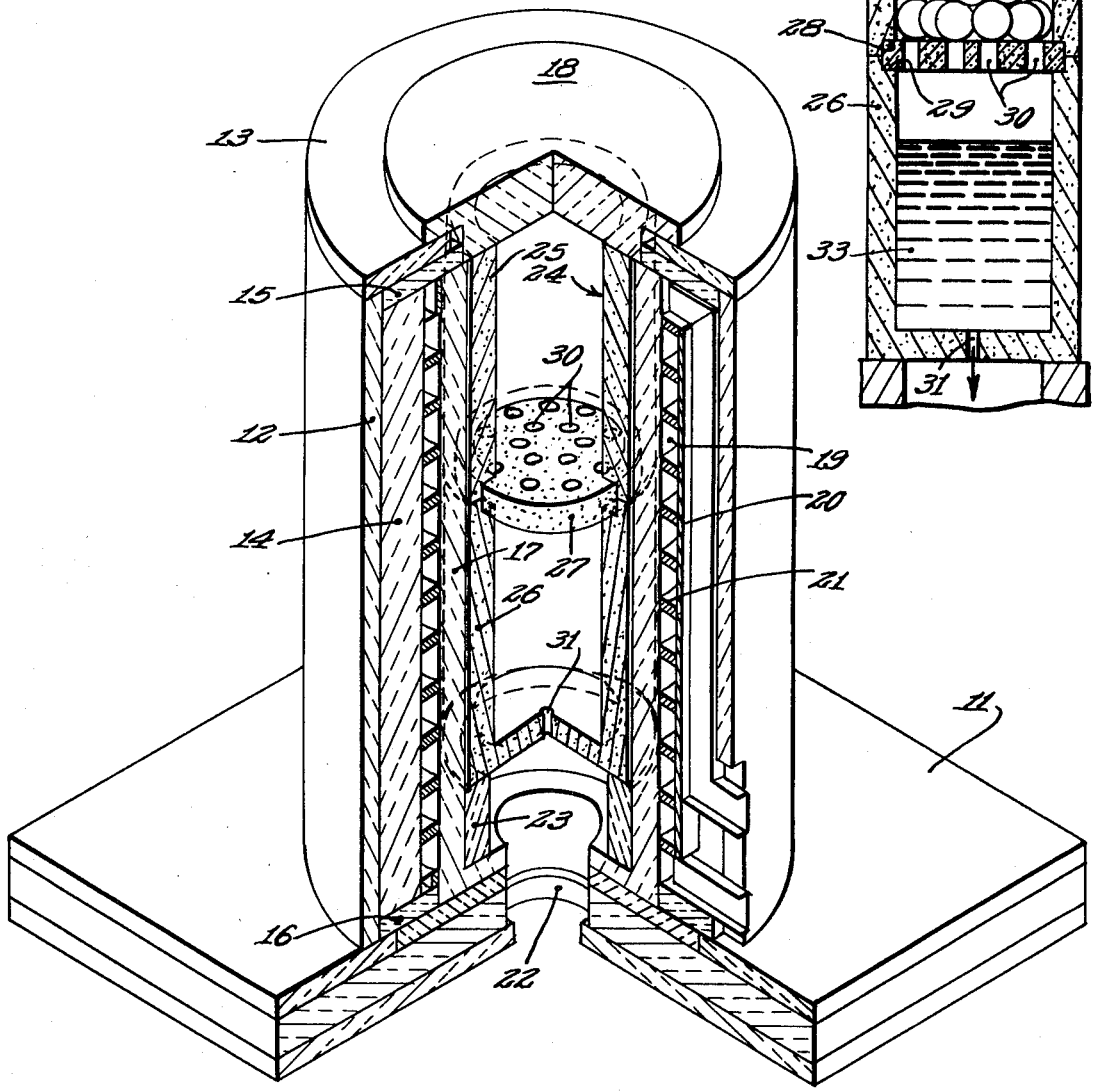

3,636,293

METHOD AND APPARATUS FOR MELTING VITREOUS-TYPE MATERIALS

BACKGROUND OF THE INVENTION

1. Field of the Invention

This invention is in the field of melting materials of the vitreous or semivitreous type in a continuous operation. The process has particular applicability to the melting material such as glasses, glaze frits, porcelain enamel frits, welding fluxes, or slags which are prepared by the application of heat to cause melting or fusion during which thermal reactions occur to give the desired end product.

2. Description of the Prior Art

The melting of vitreous and semivitreous materials, either in a batch or in a continuous process has heretofore conventionally employed either oil or gas fuels, or electrical resistance heating. It would be desirable if the advantages of induction heating could be applied to the melting of glass but since most vitreous or semivitreous materials are not electrically conducting, the melting of these materials does not lend itself to the use of induction heating. This type of heating has some distinct advantages over conventional heating systems from the standpoint of ability to control the amount of heat, the ability to concentrate the heat, greater speed in bringing temperatures up to a desired value, and in some cases economy.

SUMMARY OF THE INVENTION

This invention provides a method of melting a vitreous-type material wherein discrete particles of the material are supported on a refractory support within an induction furnace. The induction coil is used to heat an electrically conductive susceptor which radiates heat at the particles while on the support to thereby bring them to a temperature at which they can flow. The support includes a plurality of discharge passages therein and when the particles have been rendered sufficiently fluid, the vitreous material passes through the openings into a holding zone where the now molten, flowable mass can be heat treated for additional periods before being discharged from the zone. For example, the reactants going into the vitreous material can be held at the holding zone for a time sufficient for all of the chemical reactions necessary to the formation of the material to occur. Since the physical properties of the vitreous material are dependent on a correlation of time and temperature, the holding of the material in this zone provides a convenient means for accurately achieving the proper time-temperature relationships. The holding zone has a discharge in it for directing the heat-treated, molten material to other processing equipment.

BRIEF DESCRIPTION OF THE DRAWING

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which:

FIG. 1 is a view partly in perspective and partly in cross section of a melting furnace employing the improvements of the present invention; and FIG. 2 is a fragmentary cross-sectional view of the furnace interior after melting has commenced.

DESCRIPTION OF THE PREFERRED EMBODIMENTS

In FIG. 1, reference numeral 10 indicates generally an induction melting furnace including a base 11 containing a plurality of layers of refractory heat insulating material. Secured to the base 11 is a refractory shell 12 over which there is positioned a refractory top plate 13. A spacer 14 also composed of refractory material is positioned adjacent the inner wall of the shell 12 and is confined between a pair of opposed refractory discs 15 and 16 at its top and bottom, respectively. The inner wall of the furnace assembly consists of a lining 17 composed of zircon or other refractory. A cap 18 also composed of zircon or the like is removably received within the disc 15, as shown.

Disposed between the spacer 14 and the lining 17 is a hollow induction heating coil 19 which is energized from a suitable source of energy (not shown) and typically supplies electromagnetic energy at a frequency of about 9,600 to 10,000 Hertz at a high current to the furnace. The coil 19 is separated from the spacer 14 by means of an insulating strip 20 composed of mica or the like, and the individual convolutions of the coil 19 are separated from each other by means of insulator strips 21. Water or other fluid may be circulated through the coil 19 for cooling purposes.

The base 11 is provided with a discharge opening 22 for delivering the molten product to other processing equipment such as roll quenchers or the like. Disposed coaxially with the discharge opening 22 is a graphite support ring 23 on which the susceptor generally indicated at numeral 24 rests. The susceptor 24 is composed of three elements, consisting of an upper open ended tube 25 and a lower tube 26, both composed of an electrically conductive material such as graphite. Positioned between the tubes 25 and 26 is a refractory baffle 27, the upper tube 25 having a relieved annular flange portion 28 and the tube 26 having a similar relieved annular flange portion 29 for confining the baffle 27 therebetween, as illustrated in FIG. 2.

The baffle 27 is composed of a refractory material such as graphite or zircon and has a plurality of spaced passages 30 offset from the center of the circular baffle 27. The lower susceptor tube 26 is shown as being provided with a centrally disposed discharge opening 31, although obviously various valve mechanisms can be employed to control the flow of molten material out of the lower tube 26 for discharge into other processing equipment.

Initially, pellets 32 of the material to be melted are distributed along the baffle 27, the pellets 32 having a size sufficiently large so that they do not fall through the openings 30. Then, heat is applied by energization of the induction heating coil 19. After a suitable time interval, some of the pellets 32 will commence melting and will drain through the openings 30 and accumulate as a liquid pool 33 on the bottom of the lower susceptor tube 26, as illustrated in FIG. 2 of the drawings. Through the control of the discharge rate through the outlet 31, the liquid material will be held in the lower susceptor tube 26 for a time sufficient to cause whatever chemical reactions are required to occur.

It is, of course, possible to use a series of holding zones, stacked one above the other, to provide increased time for heat treatment if necessary.

The operation of the furnace can be made continuous by introducing new pellets into the furnace continuously at a rate such as to maintain unmelted pellets in the upper section of the susceptor while the molten material is being withdrawn at a regulated rate through the bottom portion of the susceptor.

The induction melting furnace of the present invention provides a convenient means for controlled melting and heat treatment of refractory, nonconductive charges of the vitreous and semivitreous type. The application of heat can be controlled more positively and more accurately with this type of furnace, resulting in the production of an improved product of uniform quality.

We claim as our invention:

1. The method of melting a vitreous-type material which comprises providing a perforate refractory support in a melting zone and a coaxial holding zone immediately below said melting zone, introducing discrete particles of said material into said melting zone, inductively heating said zone with the particles confined therein to a temperature at which the particles become fluid, discharging the resulting fluid through said refractory support and into said holding zone, heat treating the fluid mass in said holding zone to achieve a predetermined time-temperature relationship, and discharging the heat-treated mass from said holding zone.

2. The method of claim 1 in which said refractory support has spaced apertures therein offset from the center thereof, said apertures being sufficiently small to retain said particles in said melting zone prior to the particles becoming fluid.

3. A melting apparatus for melting a vitreous-type material comprising a susceptor composed of an electrically conductive material, induction heating means disposed about said susceptor, a baffle extending across said susceptor and dividing said susceptor into an upper melting zone and a lower heat-treating zone, said baffle having apertures therein sufficiently small to retain particles of material to be melted within said melting zone, and discharge means for discharging molten material from the base of said heat-treating zone.

4. The apparatus of claim 3 in which said baffle has a plurality of openings spaced from the center thereof and said lower heat-treating zone has a discharge opening at the center thereof.

5. The apparatus of claim 3 in which said baffle consists of an apertured disc disposed between a pair of refractory sleeves which form the susceptor.

* * * * *